United States Patent
Ai

(10) Patent No.: US 6,702,704 B2
(45) Date of Patent: Mar. 9, 2004

(54) ECCENTRIC PLANETARY TRACTION DRIVE TRANSMISSION WITH A SINGLE PLANETARY ROLLER

(75) Inventor: Xiaolan Ai, Massillon, OH (US)

(73) Assignee: The Timken Company, Canton, OH (US)

( * ) Notice: Subject to any disclaimer, the term of this patent is extended or adjusted under 35 U.S.C. 154(b) by 38 days.

(21) Appl. No.: 10/233,697

(22) Filed: Sep. 4, 2002

(65) Prior Publication Data

US 2003/0199357 A1 Oct. 23, 2003

Related U.S. Application Data

(60) Provisional application No. 60/374,748, filed on Apr. 23, 2002.

(51) Int. Cl.$^7$ ................................................. F16H 1/32
(52) U.S. Cl. ........................... 475/165; 475/195; 476/61
(58) Field of Search ................................ 475/195, 165; 476/61

(56) References Cited

U.S. PATENT DOCUMENTS

| | | |
|---|---|---|
| 1,093,922 A | 4/1914 | Dieterich |
| 2,529,996 A | 11/1950 | Browne |
| 3,375,739 A | 4/1968 | Nasvytis |
| 3,475,993 A | 11/1969 | Hewko |
| 3,945,270 A | 3/1976 | Nelson |
| 4,478,100 A * | 10/1984 | Sfredda ....................... 475/165 |
| 4,555,963 A | 12/1985 | Nelson |
| 6,095,940 A * | 8/2000 | Ai et al. ...................... 475/197 |
| 6,406,399 B1 * | 6/2002 | Ai ............................... 475/183 |

FOREIGN PATENT DOCUMENTS

| | | |
|---|---|---|
| DE | 2458762 | 6/1976 |
| EP | 10311398 | 11/1998 |
| EP | 10331933 | 12/1998 |

OTHER PUBLICATIONS

PCT Appln. No. PCT/US03/10422, International Search Report, Jul. 21, 2003.

* cited by examiner

Primary Examiner—Dirk Wright
(74) Attorney, Agent, or Firm—Polster, Lieder, Woodruff & Lucchesi, L.C.

(57) ABSTRACT

An eccentric planetary traction drive transmission in which a planetary roller is positioned between and in contact with an outer ring member and a sun roller member. Rotation of either the outer ring member or the sun roller member wedges the planetary roller within a convergent gap which squeezes the planetary roller between the outer ring member and the sun roll member. Friction between the planetary roller, the sun roller member, and the outer ring member transmits rotational motion and torque between the outer ring member and the sun roller member. An internal carrier with a plurality of bearings supports the sun roller member within the outer ring member.

17 Claims, 4 Drawing Sheets

ECCENTRIC PLANETARY TRACTION DRIVE TRANSMISSION WITH A SINGLE PLANETARY ROLLER

CROSS-REFERENCE TO RELATED APPLICATIONS

This application is related to U.S. Provisional Patent Application No. 60/374,748 filed Apr. 23, 2002 from which priority is claimed.

STATEMENT REGARDING FEDERALLY SPONSORED RESEARCH OR DEVELOPMENT

Not applicable.

BACKGROUND OF THE INVENTION

1. Field of the Invention

This invention relates in general to a planetary traction drive transmission, and, more particularly, to a planetary traction drive transmission having a single planetary roller.

2. Description of Related Art

Traction drives use frictional force to transmit torque and power. Because the power is transmitted between two smooth surfaces, often through a thin layer of lubricant, a traction drive possesses unique characteristics that are not readily attainable by gear drives. These characteristics include quietness, high-efficiency, high rotational accuracy, and zero-backlash.

Generating adequate normal force at the contact is essential for traction drives. Various loading mechanisms have been proposed. These mechanisms have lead to a host of designs. A common practice is to use tapered surfaces along the axial direction. By moving these surfaces axially, a radial displacement and thus normal force are generated. Examples of such designs are disclosed in U.S. Pat. Nos. 3,475,993 and 3,375,739.

Since the envelopes of the tapered surfaces in most designs do not necessarily converge to a common point, this results in a so-called spin motion at contacting surfaces. The spin motion not only offsets the high-efficiency otherwise provided by the traction drive, but also causes component wear and high break away torque.

Recently, a design of zero-spin planetary traction drive has been proposed by Ai as disclosed in the U.S. Pat. No. 6,095,940. This design employs the on-apex concept similar to that of tapered roller bearings. Two rows of planetary rollers are used to balance the internal axial force on the planetary rollers. Although this design offers torque actuated loading mechanism and greater torque capability, it is somewhat complex in construction.

The cylindrical planetary traction drive is also able to achieve zero-spin motion. However, generating sufficient normal force at the contacts has been a challenge. Designs proposed in the past have offered various means to pre-load the drive either by mechanically deforming the outer rings or by thermal assembling the drive. The pre-load generated by such means, in general, can not be adjusted during operation. For partial load application, traction drives are unnecessarily overloaded. This has negative impacts on transmission efficiency and service life.

Perhaps the simplest means to generate torque responsive load is using eccentric planetary drives as was disclosed by Dieterich U.S. Pat. No. 1,093,922 in 1914. Over the years, various improvements have been proposed. See for example, U.S. Pat. Nos. 3,945,270, 4,481,842, 4,555,963, and foreign patent numbers JP10-311398, EP 0,856,462 A2. They all have multiple planetary rollers, and each planetary roller requires a supporting shaft.

While multiple planets help to balance the load, virtually reducing bearing loads, they require bearings and supporting shafts. This makes such drives less attractive in some applications where torque demand is not high, and cost of manufacturing is a major concern. In addition, most of the eccentric wedge loading arrangements in prior art were based on a specified friction coefficient, assuming it did not change as torque load changes. As a consequence the loading mechanism was either over conservative or inadequate throughout the whole torque load spectrum.

Therefore, it is desirable to provide a simple and low cost design that allows for improved adaptive, torque responsive loading mechanism.

SUMMARY OF THE INVENTION

This patent application relates to a planetary traction drive transmission, and, more particularly, to a planetary traction drive transmission having a single planetary roller or ring.

DESCRIPTION OF THE DRAWINGS

Corresponding reference characters indicate corresponding parts throughout the several views of the drawings.

DETAILED DESCRIPTION OF THE INVENTION

Figure 1:
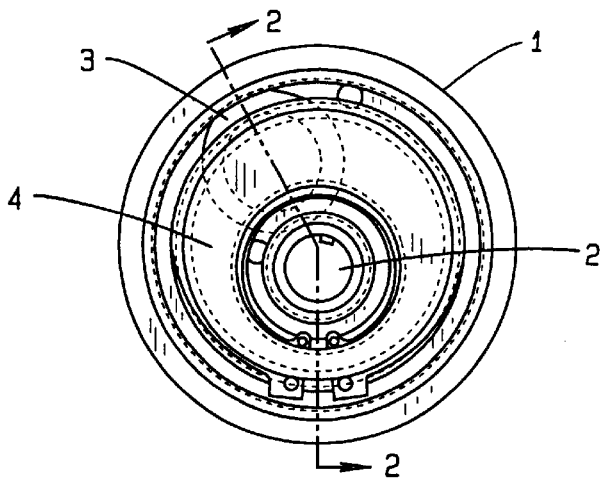
FIG. 1 is a front view of the eccentric planetary traction drive.
Figure 2:
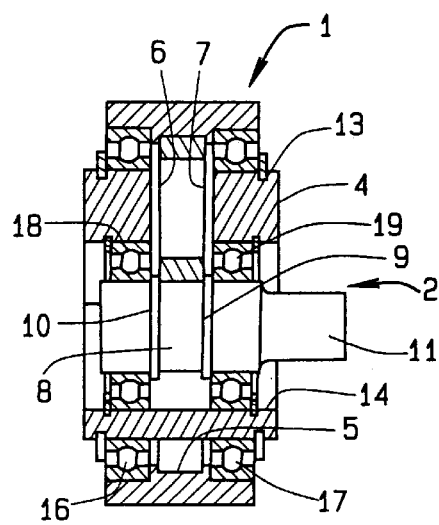
FIG. 2 is a generally longitudinal sectional view of the eccentric planetary traction drive.
Figure 3:
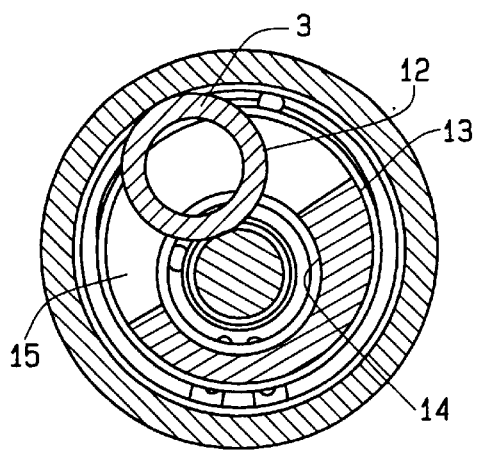
FIG. 3 is a generally transverse sectional view of the eccentric planetary traction drive.
Figure 4:
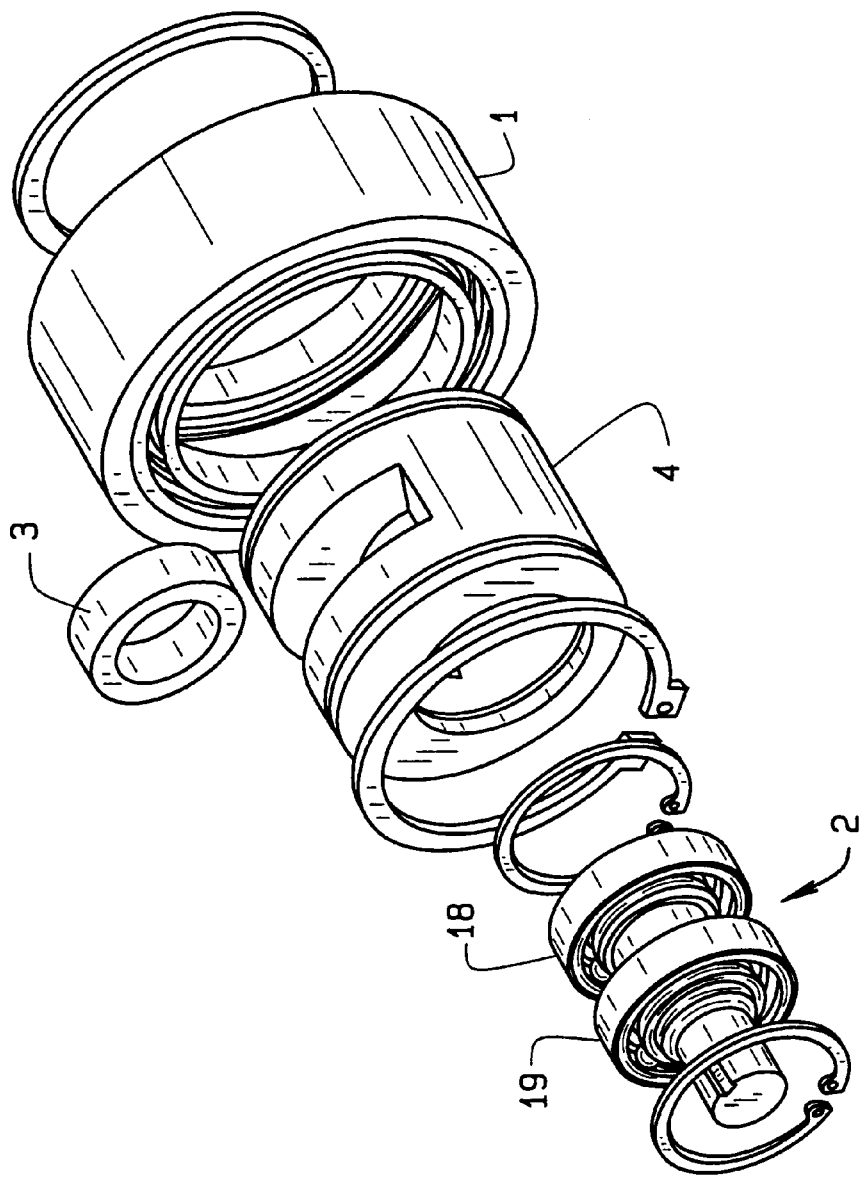
FIG. 4 is an exploded view of the eccentric planetary traction drive.

Referring now to FIGS. 1 and 2, one embodiment of the cylindrical planetary traction drive A comprises an outer ring member 1, a sun roller member 2, a planetary roller 3, a carrier member 4. The outer ring member 1 further comprises a cylindrical raceway 5 surrounding the axis of rotation, and two fixed flanges 6 and 7. The sun roller member 2 includes a cylindrical raceway 8, two fixed flanges 9 and 10, and a shaft 11. The planetary roller 3, having an outer cylindrical raceway 12, is placed between and in contact with cylindrical raceways 5 and 8. The carrier 4 contains a cylindrical outer surface 13 and an inner cylindrical surface 14. The outer surface 13 is set to be eccentric to the inner surface 14. Carrier 4 further contains a cavity (a slot) 15 (FIG. 3) for receiving the planetary roller 3. The cylindrical raceway 5 (FIG. 2) on outer ring member 1 is co-centric with the outer surface 13 of the carrier 4. In fact, the outer ring member 1 is supported on the outer surface 13 by two bearings 16 and 17. The cylindrical raceway 8 on the sun member 2 is co-centric with the inner surface 14 of the carrier 4. The sun member is supported in the inner surface 12 by two bearings 18 and 19 (FIG. 4).

Figure 5:
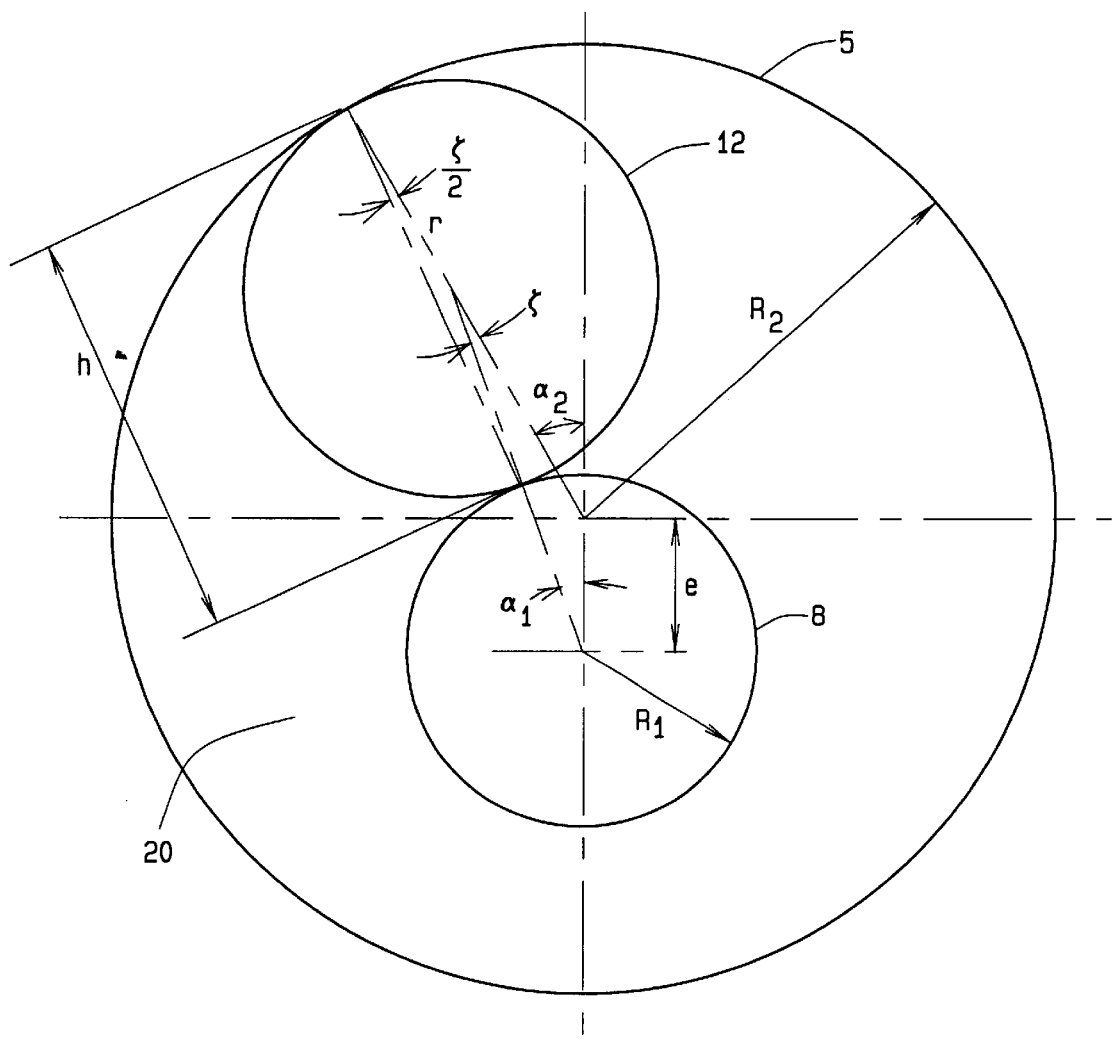
FIG. 5 is a diagram showing the mathematical relationship between some of the components of the eccentric planetary traction drive.

As one can see, the raceway 5 (FIG. 2) on the outer ring member 1 is eccentric to the raceway 8 on the sun member 2. The space between the two raceways forms a wedge gap 20 (FIG. 5). Referring to FIG. 5, the planetary roller 3 is assembled between the wedged-space at an azimuth angle between $\alpha_2=-90$ to 90 degrees, preferably in vicinity of $\alpha_2=0$, with the outer surface 12 in contact with the raceway 8 and the raceway 5. Planetary roller 3 is sufficiently flexible in the radial direction. When squeezed, its diameter changes in the corresponding direction.

Since the sun roller 2 and the outer ring 1 are not concentric, the drive is preferred to operate with the carrier being stationary. During operation, the traction force tangent to the outer surface 12 of planetary roller 3 always pushes the planetary roller 3, depending on torque direction, into a convergent wedge. Roller 3 is thus squeezed generating substantial contacting force normal to the contact surfaces. If the eccentricity e in relationship to the geometry of the planetary train is favorable, a balance is achieved where the maximum available traction force is equal to or greater than the operating traction force. This condition is called frictional self-loading. The relationship for ensuring such fictional self-loading is set forth by $$\tan\frac{\delta}{2} \leq \mu_T \tag{1a}$$

where $\delta$ is the wedge angle and is determined by $$\delta = \arccos\left[\frac{(R_1+r)^2+(R_2-r)^2-e^2}{2(R_1+r)(R_2-r)}\right] \tag{2}$$

The variable $R_1$ is the radius of the sun roller raceway 8 and the variable $R_2$ is the radius of the outer ring raceway 5. The variable r is the radius of the self-loading planetary roller 3. The variable e represents the eccentricity between the raceways of the sun roller and the outer ring. The variable $\mu_T$ is the maximum possible friction coefficient at the contacts. The wedge angle $\delta$ represents a contact geometry. The equation $\mu_G=\tan(\delta/2)$ is referred to as geometry coefficient. As one can see, $\mu_G$ changes as the diameter 2r of the planetary roller changes.

For optimal efficiency and service life of the drive, it is always desirable to have geometry coefficient $\mu_G$ close to, but slightly smaller than, the maximum available traction coefficient $\mu_T$ under various load conditions. That is $$\mu_G \leq \mu_T \tag{1b}$$

During operation, planetary roller 3 is entrained into a convergent wedge and squeezed. Consequently, the diameter reduces. Planetary roller 3 thus moves to a new azimuth position establishing a new balance.

The diametrical reduction of the planetary roller 3 can be estimated by $$2dr = \left(\frac{\pi}{4}-\frac{2}{\pi}\right)\frac{Wr^3}{EI} \tag{3}$$

where W is the contact load; E is the Young's elastic modulus and I is the area moment of inertia of ring cross section for the flexible planetary roller 3.

Accordingly, the geometry coefficient $\mu_G$ changes to $$\mu_G = \tag{4}$$
$$\tan\left\{\frac{1}{2}\text{Arccos}\left[\frac{(R_1+R_2+e-2dr)^2+(R_1+R_2-e+2dr)^2-4e^2}{2(R_1+R_2+e-2dr)(R_1+R_2-e+2dr)}\right]\right\}$$

Figure 6:
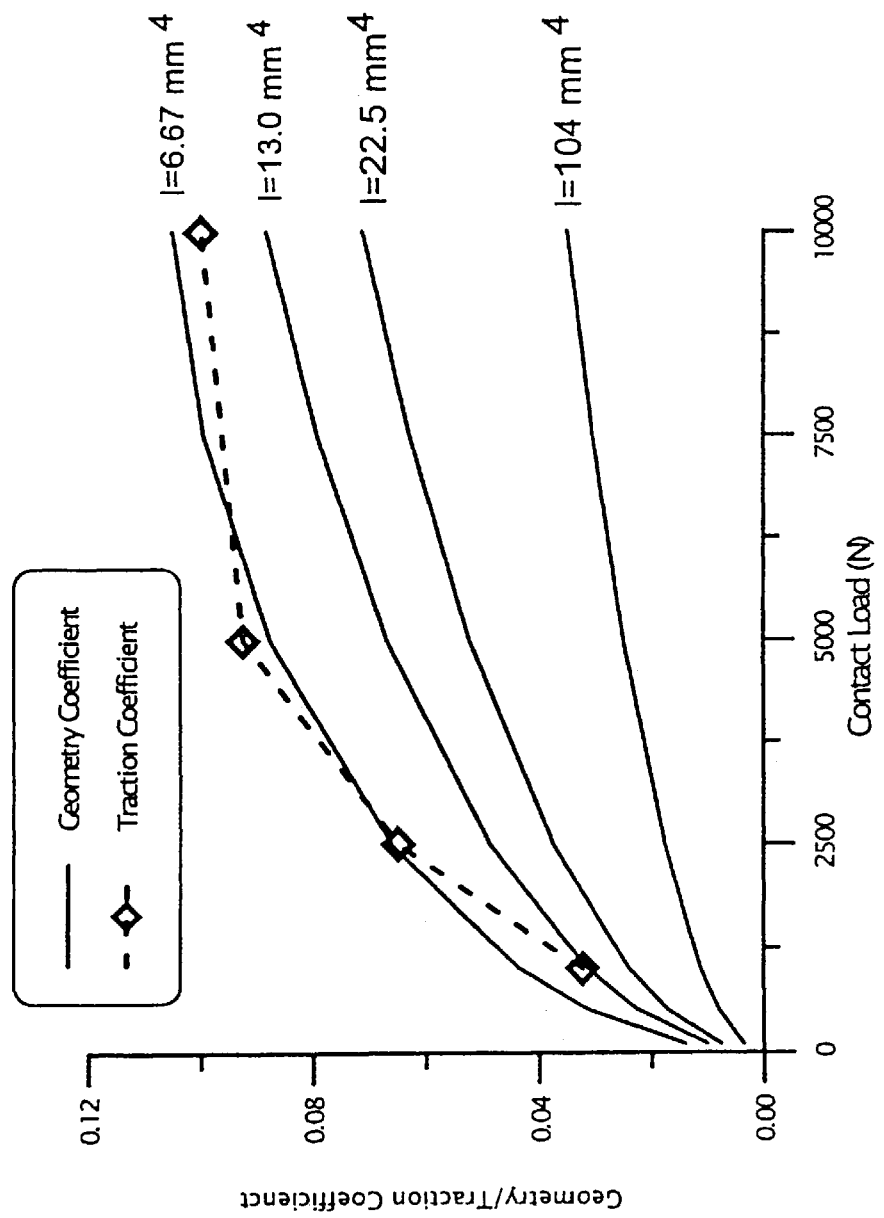
FIG. 6 is a graph showing the relationship between the contact load and the geometry/traction coefficient of the present invention.

For planetary roller assembled initially between $\alpha_2=-90$ to $+90$, the geometry coefficient $\mu_G$ increases as the roller diameter reduces or as the contact load increases. FIG. 6 shows the variation of $\mu_G$ with contact load W for planetary rollers with different cross section moment of inertia I.

On the other hand, research results (Tevaarwerk, NASA CR-1652267 1981) showed that the maximum available traction coefficient $\mu_T$ also increases with contact load or pressure as shown in FIG. 6.

The flexible, floating planetary roller design of the current invention provides an opportunity for an adoptive frictional self-loading mechanism. By choosing a flexible planetary roller with adequate cross section moment of inertia I, it is possible to match or compensate for the change of the maximum available traction coefficient due to the change of the contact load. For example, the second curve with I=13 mm$^4$ as shown in FIG. 6 demonstrates such a design principle.

The reaction force on the sun roller 2 (FIG. 4) as the result of frictional self-loading is supported by the two bearings 18 and 19, through which the force is passed on to the carrier 4. Similarly, the reaction force on the outer ring 1 of frictional self-loading is supported by bearings 16 and 17 (FIG. 2) and passed on to carrier 4. The two reaction forces form a reaction moment that will be balanced by the structure to which the carrier is mounted. Alternatively, the change in geometry coefficient $\mu_G$ under load can be introduced by deformation of supporting bearings 16, 17, 18, and 19, and deflections of sun shaft 2 and outer ring 1. In these cases, $\mu_G$ is changes through change of eccentricity e.

While the above description describes various embodiments of the present invention, it will be clear that the present invention may be otherwise easily adapted to fit any configuration where a eccentric planetary traction drive may be utilized.

As various changes could be made in the above constructions without departing from the scope of the invention, it is intended that all matter contained in the above description or shown in the accompanying drawings shall be interpreted as illustrative and not in a limiting sense.

What I claim is:

1. A planetary traction drive transmission comprising:
   a carrier member;
   an outer ring member, the outer ring member being supported by the carrier member;
   a sun roller member eccentric to the outer ring member, the sun roller member being supported by the carrier member; and
   a planetary roller positioned between and in frictional contact with both the outer ring member and the sun roller member such as to communicate rotational motion between the outer ring member and the sun roller member and effectively change the geometry coefficient $\mu_G$ as loads increase.

2. The planetary traction drive transmission of claim 1 wherein the planetary roller is sufficiently flexible in the radial direction to communicate the rotational motion.

3. The planetary traction drive transmission of claim 2 wherein the outer ring member further comprises an axis of rotation, a cylindrical raceway surrounding the axis of rotation, and two fixed flanges axially aligned with the cylindrical raceway.

4. The planetary traction drive transmission of claim 3 wherein the sun roller member further comprises a shaft, two fixed flanges, and a cylindrical raceway eccentric to the cylindrical outer raceway.

5. The planetary traction drive transmission of claim 4 wherein the planetary roller includes an outer cylindrical raceway.

6. The planetary traction drive transmission of claim 5 wherein the carrier member includes a cavity for receiving the planetary roller, a cylindrical outer surface, and an inner cylindrical surface wherein the cylindrical outer surface is eccentric to the inner cylindrical surface, and the cylindrical outer surface is co-eccentric with the cylindrical raceway of the outer ring member.

7. The planetary traction drive transmission of claim 6 wherein the cylindrical raceway of the sun roller member is co-eccentric with the inner cylindrical surface of the carrier member.

8. The planetary traction drive transmission of claim 7 wherein the outer ring member is supported on the cylindrical outer surface of the carrier by two bearings.

9. The planetary traction drive transmission of claim 8 wherein the sun roller member is supported in the inner cylindrical surface of the carrier.

10. The planetary traction drive transmission of claim 9 wherein the space between the cylindrical raceway and the cylindrical raceway forms a convergent wedge gap.

11. The planetary traction drive transmission of claim 10 wherein the planetary roller is assembled in the wedge gap at an azimuth angle between $\alpha_2 = -90$ to 90 degrees.

12. The planetary traction drive transmission of claim 11 wherein the relationship for ensuring sufficient frictional self-loading within the planetary traction drive transmission is set forth in the formula $$\tan\frac{\delta}{2} \leq \mu_T \tag{1a}$$

where:
$\mu_T$ is the maximum possible friction coefficient at the contacts; and
$\delta$ is the wedge angle determined by:

$$\delta = \arccos\left[\frac{(R_1 + r)^2 + (R_2 - r)^2 - e^2}{2(R_1 + r)(R_2 - r)}\right] \tag{2}$$

where:
$R_1$ is the radius of the sun roller raceway;
$R_2$ is the radius of the outer ring raceway;
$r$ is the effective operating radius of the self-loading planetary roller under load; and
$e$ represents the effective operating eccentricity between the raceways of the sun roller; and the outer ring.

13. The planetary traction drive transmission of claim 12 wherein the effective operating radius is estimated by $$r = r_0 - dr$$

and the diametrical reduction $2dr$ of the planetary roller as the planetary roller is entrained into the convergent wedge is characterized by $$2dr = \left(\frac{\pi}{4} - \frac{2}{\pi}\right)\frac{Wr^3}{EI} \tag{3}$$

where:
W is the contact load;
E is the Young's elastic modulus; and
I is the area moment of inertia of ring cross section for the flexible planetary roller.

14. The planetary traction drive transmission of claim 13 wherein the geometry coefficient $\mu_G$ is characterized by $$\mu_G = \tan\left\{\frac{1}{2}\text{Arccos}\left[\frac{(R_1 + R_2 + e - 2dr)^2 + (R_1 + R_2 - e + 2dr)^2 - 4e^2}{2(R_1 + R_2 + e - 2dr)(R_1 + R_2 - e + 2dr)}\right]\right\} \tag{4}$$

and the geometry coefficient $\mu_G$ is set to be close to, but slightly smaller than the maximum available friction coefficient $\mu_T$.

15. The planetary traction drive transmission of claim 14 wherein the planetary roller is made from a material which is sufficiently flexible to allow the planetary traction drive transmission to act as an adoptive self-loading mechanism.

16. The planetary traction drive transmission of claim 15 wherein the geometry coefficient $\mu_G$ matches the change of maximum available traction coefficient due to changes in the contact load between the planetary roller and the outer ring member, and between the planetary roller and the sun roller member.

17. A method of transmitting rotational motion and torque comprising the steps of:
installing a sun roller member into an outer ring member such that the sun roller member is eccentric to the outer ring member and a wedge gap is formed between the sun roller member and the outer ring member;
manufacturing a planetary roller member from one of either a material or a combination of materials having sufficient flexibility to create frictional self-loading and necessary damping between the planetary roller and the outer ring member, and the planetary roller and the sun roller member;
installing the planetary roller member into the wedge gap such that the planetary roller member is between and in contact with the sun roller member and the outer ring member; and
wedging the planetary roller member between the outer ring member and the sun roller member by rotation of at least one of either the sun roller member or the outer ring member such that rotation and torque is transmitted from the outer ring member and the sun roller member.

* * * * *